(No Model.)
R. W. WHITEHURST.
ICE CREAM FREEZER.
No. 461,397.      Patented Oct. 13, 1891.
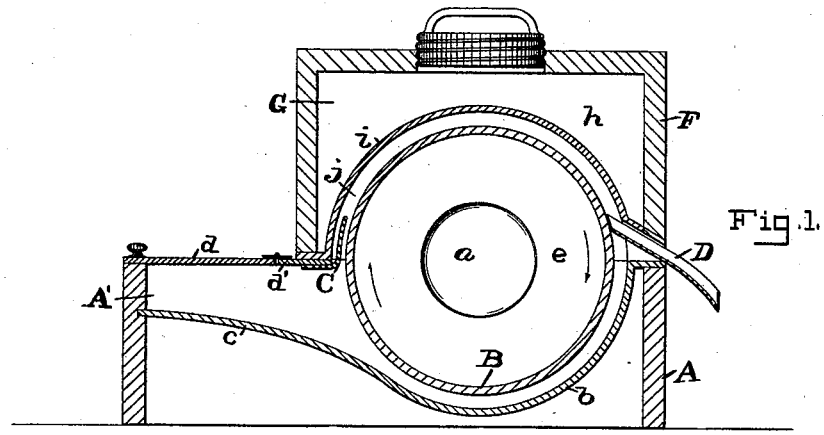
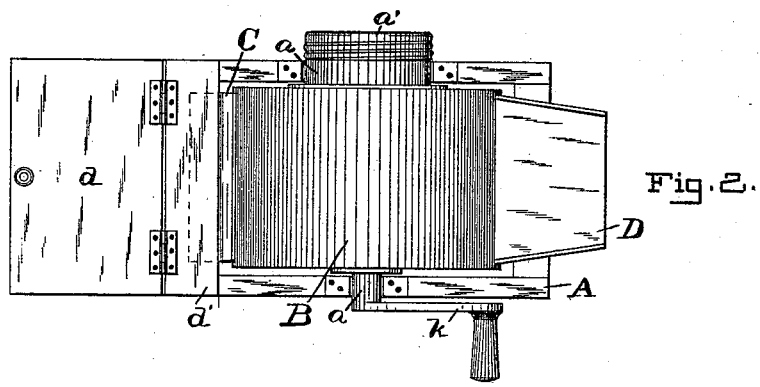
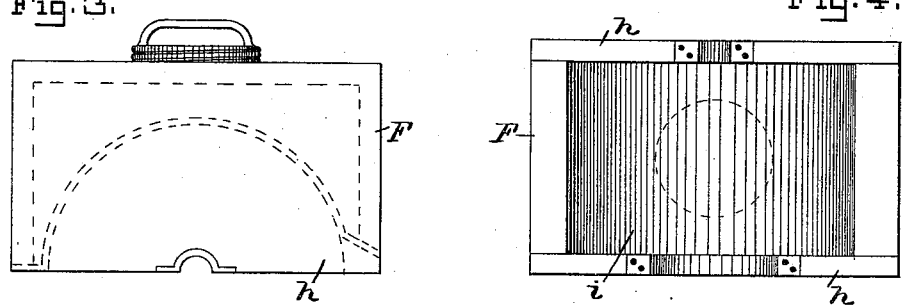
WITNESSES:
Otto H. Ehlers
F. P. Davis
INVENTOR:
Robert W. Whitehurst,
BY Chas. B. Mann
ATTORNEY.

UNITED STATES PATENT OFFICE.

ROBERT W. WHITEHURST, OF NORFOLK, VIRGINIA, ASSIGNOR OF ONE-HALF TO McD. L. WRENN, OF SAME PLACE.

ICE-CREAM FREEZER.

SPECIFICATION forming part of Letters Patent No. 461,397, dated October 13, 1891.

Application filed March 12, 1891. Serial No. 384,770. (No model.)

*To all whom it may concern:*

Be it known that I, ROBERT W. WHITEHURST, a citizen of the United States, residing at Norfolk, in the county of Norfolk and State of Virginia, have invented certain new and useful Improvements in Ice-Cream Freezers, of which the following is a specification.

This invention relates to an improvement in that class of ice-cream freezers in which the cream is frozen on the outside surface of a revolving freezing cylinder or drum containing the refrigerant and scraped off the same as it freezes thereon.

The object of the invention is to provide a machine wherein the cream is brought to a more hardened state than heretofore; and with this end in view the invention consists in the features of construction and combination of parts hereinafter pointed out.

In the accompanying drawings, illustrating the invention, Figure 1 represents a longitudinal section through the center of the machine; Fig. 2, a top view with the cylinder-cover removed; Figs. 3 and 4, views of the cylinder-cover, and Fig. 5 a detail view of a compressor-plate employed.

In the drawings, the letter A designates a rectangular receptacle, in one end of which is mounted the revolving freezing-drum B, whose trunnions *a* have bearings in the sides of the receptacle. The lower half of the said drum is contained in the receptacle A, and the bottom of the latter is made concave to conform to the cylindric part of the drum, as shown at *b*, Fig. 1, and the cylinder works close to the concave bottom. The bottom *c* at the opposite end A' of the receptacle is above the concave portion *b* beneath the drum and is inclined down to the said concave portion *b*. This part A' of the receptacle serves as a storage reservoir to be filled with cream, which flows down the incline to the base of the concave bottom *b* and fills the space around the lower half of the drum. As the cream freezes on the cylindric surface of the drum and is taken out by the revolution of the latter, more flows down from the reservoir A' until all the cream has been taken out by the freezing-drum. The cream is thus self-feeding, and all of it is frozen and no waste is occasioned.

The end A' of the receptacle is closed by a lid *d*, which is hinged to a cross-strip *d'* on top of the said receptacle. At the edge of this cross-strip, adjacent to the cylinder, is secured an upward-projecting plate C, which is the width of the cylinder or drum B and inclines toward the same. The upper portion of this plate is curved to conform to the cylindric surface of the drum and is close to the latter, as seen in Fig. 1, so that only a very narrow space is allowed between the plate and the drum.

When the cream freezes on the surface of the drum and is turned out of the receptacle A, its outer portion is somewhat soft. As it passes beneath the inclined plate C, however, it will be pressed or packed upon the drum and frozen hard thereon. Hence the plate C is a compressor or "slicker," which packs the cream on the cylindric surface of the drum. At the opposite side of the cylinder a scraper D is located. It is fastened on the edge of the receptacle A, inclining toward the cylinder, and has its upper edge in contact with the surface of the latter. This scraper serves to scrape the frozen cream off the cylindric surface of the drum as the latter revolves after said cream has passed the compressor-plate C and is frozen hard.

The cylinder B is of metal. Its ends *e* may, however, be exteriorly covered with wood to prevent the cream from freezing to the ends or heads of the drum and allow it to freeze only on the metal cylindrical surface.

A cover F is provided to fit over the drum, and comprises a freezing-chamber G, embracing the upper portion of said drum. This cover F rests on the receptacle A, and its sides *h* fit over the trunnions *a* of the drum. It has an interior concave surface *i*, conforming to that of the drum, and there is a space *j* allowed between this concave surface and the surface of the drum for the cream to pass through.

The drum is filled through one of its trunnions *a*, which is hollow and on the end of which is a screw-cap *a'*. To the other trunnion is fastened a crank *k* for turning the drum.

From the foregoing description the operation of the machine will be apparent. The drum B is filled with ice and salt, as is also the chamber G. Cream is poured in desired quantity into the reservoir A' of the receptacle A and flows down around the drum and freezes to the surface of the same. The drum is revolved by means of the crank $k$, and the cream which freezes to its cylindrical surface is carried beneath the presser or slicker C, and is packed thereby upon the drum. It passes thence through the space $j$ between the drum and freezing-chamber G and is frozen hard, so that when it reaches the scraper D and is scraped off thereby it is in condition to be served.

Having thus described my invention, what I claim as new, and desire to secure by Letters Patent, is—

1. In an ice-cream freezer, the combination of a receptacle for cream, a revolving freezing-drum in said receptacle working through the cream contained therein, a compressor-plate arranged at one side of the drum and inclined tangentially toward the same to pack the cream on the latter as it revolves, and a scraper to scrape the frozen cream off the drum after it has passed said compressor-plate.

2. In an ice-cream freezer, the combination of a receptacle for cream, a cross-piece at the top of the same, a revolving freezing-drum in said receptacle working through the cream contained therein, a compressor-plate secured to the cross-piece at one side of the drum and having its upper portion curved and inclined toward the drum to pack the cream on the latter as it revolves, a cover over the upper portion of the drum, a space being left between said chamber and the drum, through which the cream passes after being packed by the said compressor-plate, and a scraper to scrape off the frozen cream after it has passed through said freezing-space.

3. In an ice-cream freezer, the combination of a receptacle having at one end a concave bottom and at the other a reservoir for cream, higher than said concave bottom and communicating therewith, and a cross-piece at the top of the receptacle between the concaved bottom and the reservoir, a revolving freezing-drum mounted in the end of the said receptacle having the concave bottom and working close to the latter and through the cream thereon, a lid for the reservoir, hinged to the cross-piece, a removable freezing-chamber over the drum, a compressor secured to the cross-piece, and a scraper to scrape the frozen cream off the drum.

In testimony whereof I affix my signature in the presence of two witnesses.

ROBERT W. WHITEHURST.

Witnesses:
F. D. LOWELL,
GEO. D. DEY.